United States Patent
Feckl et al.

(10) Patent No.: US 11,557,967 B2
(45) Date of Patent: Jan. 17, 2023

(54) VOLTAGE REGULATOR WITH ADAPTIVE FEED-FORWARD COMPENSATION FOR PERIODIC LOADS

(71) Applicant: Texas Instruments Incorporated, Dallas, TX (US)

(72) Inventors: Florian Feckl, Hohenpolding (DE); Nigel Peter Smith, Munich (DE); Erich Johann Bayer, Thonhausen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/863,251

(22) Filed: Apr. 15, 2013

(65) Prior Publication Data

US 2014/0292293 A1  Oct. 2, 2014

Related U.S. Application Data (60) Provisional application No. 61/806,305, filed on Mar. 28, 2013.

(51) Int. Cl.
  *H02M 3/156* (2006.01)
  *H02M 1/00* (2006.01)

(52) U.S. Cl.
  CPC .... *H02M 3/156* (2013.01); *H02M 2001/0019* (2013.01); *H02M 2003/1566* (2013.01)

(58) Field of Classification Search
  CPC ............... H02M 3/156; H02M 1/44; H02M 2001/0019; H02M 2003/1566; H02M 3/1588
  USPC ......................................... 323/280, 304, 282
  See application file for complete search history.

(56) References Cited

U.S. PATENT DOCUMENTS

| | | | |
|---|---|---|---|
| 7,019,503 B1* | 3/2006 | Ortiz ....................... | H02M 1/15 323/222 |
| 7,671,575 B1* | 3/2010 | Suzuki .................. | H02M 3/156 323/284 |
| 7,957,847 B2* | 6/2011 | Donaldson et al. .......... | 700/298 |
| 8,134,253 B2 | 3/2012 | Watanabe | |
| 2002/0125871 A1* | 9/2002 | Groom .................. | H02M 3/156 323/284 |
| 2006/0126367 A1* | 6/2006 | Hesterman ........ | H02M 3/33507 363/89 |
| 2006/0147049 A1* | 7/2006 | Bayley ................... | H03G 3/001 381/56 |

(Continued)

FOREIGN PATENT DOCUMENTS

| CN | 1371544 A | 9/2002 |
|---|---|---|
| CN | 101034848 A | 9/2007 |

(Continued)

OTHER PUBLICATIONS

PCT Search Report dated Mar. 28, 2014.

(Continued)

*Primary Examiner* — Harry R Behm
(74) *Attorney, Agent, or Firm* — Ray A. King; Frank D. Cimino (57) ABSTRACT

A voltage regulator for providing power to a system includes feedforward circuitry receiving a signal from the system indicating the current needed by the system, and the feedforward circuitry causes the voltage regulator to change the voltage regulator output current in response to the signal from the system.

19 Claims, 5 Drawing Sheets

(56) References Cited

U.S. PATENT DOCUMENTS

| | | | |
|---|---|---|---|
| 2008/0055946 A1* | 3/2008 | Lesso | H02M 3/158 363/63 |
| 2010/0052628 A1* | 3/2010 | Khayat | H02M 3/156 323/234 |
| 2010/0157631 A1* | 6/2010 | Lim | H02M 1/44 363/41 |
| 2011/0260703 A1* | 10/2011 | Laur | H02M 3/1563 323/271 |
| 2012/0243264 A1* | 9/2012 | Nakagawa | H02M 3/156 363/16 |
| 2013/0002218 A1 | 1/2013 | Thomas et al. | |

FOREIGN PATENT DOCUMENTS

| | | | |
|---|---|---|---|
| CN | 102153858 A | | 8/2011 |
| CN | 102792242 A | | 11/2012 |
| RU | 2011275 | | 4/1994 |
| SU | 728206 | | 4/1980 |
| WO | PCT/US94/09950 | * | 9/1994 |
| WO | 2008102479 A1 | | 8/2008 |

OTHER PUBLICATIONS

English Machine translation for WO2008102479A1 (39 pages).
Search Report for Chinese Patent Application No. 201480018658.3, included in Notification of First Office Action, dated Jun. 28, 2017 (4 pages).

* cited by examiner

FIG. 7

VOLTAGE REGULATOR WITH ADAPTIVE FEED-FORWARD COMPENSATION FOR PERIODIC LOADS This application claims the benefit of U.S. Provisional Application No. 61/806,305, filed Mar. 28, 2013, which is hereby incorporated by reference.

BACKGROUND

Voltage regulators are circuits designed to automatically maintain a constant output voltage. Some voltage regulators operate in a linear mode, and some operate in a switching mode (in which at least one element acts as an on/off switch). Typically, voltage regulators cannot respond instantaneously to a sudden change in load current. Output capacitors are commonly used to reduce ripple and to help reduce output voltage transients resulting from sudden changes in load current.

Many systems use voltage regulator output capacitors that have a ceramic dielectric. These types of capacitors, with ceramic layers and metal electrodes, are inherently piezoelectric. As a result, they may vibrate audibly if there are periodic voltage changes that are within the human audible frequency range (20 Hz-20 KHz). For example, liquid crystal displays used for computer monitors and televisions may be refreshed at 240 times per second, and 3D displays may be refreshed at twice that rate. Each refresh cycle may require a large change in power supply current, which may cause a voltage transient at the voltage regulator output capacitors. For voltage regulators driving displays or other systems with periodic load current changes, objectionable audible noise may be generated by the output capacitors. There is a general need for reducing voltage transients at the output of voltage regulators and in particular, a need for reducing audible noise from the output capacitors of voltage regulators.

DETAILED DESCRIPTION

Figure 1:
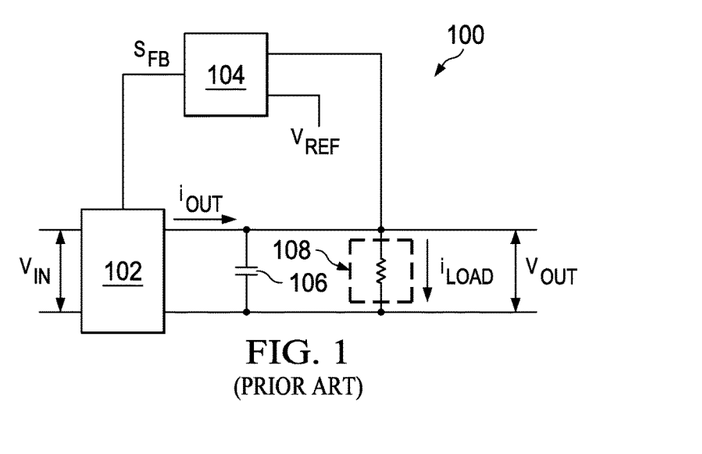
FIG. 1 is a schematic block diagram of an example embodiment of a prior-art voltage regulator.

FIG. 1 illustrates an example of a prior art voltage regulator 100 for providing power to a load 108. The load 108 is depicted as a resistor, but in general the load 108 may be a system with varying current demands. The illustrated voltage regulator 100 (simplified to facilitate illustration and explanation) includes a DC-DC converter 102 and feedback circuitry 104. The DC-DC converter 102 converts power at an input voltage $V_{IN}$ to power at an output voltage $V_{OUT}$. The input voltage $V_{IN}$ may be greater than the output voltage $V_{OUT}$ or the output voltage $V_{OUT}$ may be greater than the input voltage $V_{IN}$. The DC-DC converter 102 may be a linear circuit, or it may be a switching circuit. The feedback circuit 104 compares the output voltage $V_{OUT}$ to a reference voltage $V_{REF}$ and generates a feedback signal $S_{FB}$ that causes the DC-DC converter 102 to generate more or less current to maintain a constant output voltage $V_{OUT}$. An output capacitor 106 is essential for switching DC-DC converters. For all types of DC-DC converters, the output capacitor 106 helps reduce ripple on the output voltage, and also helps reduce output voltage transients resulting from sudden changes in load current $i_{LOAD}$.

Figure 2A:
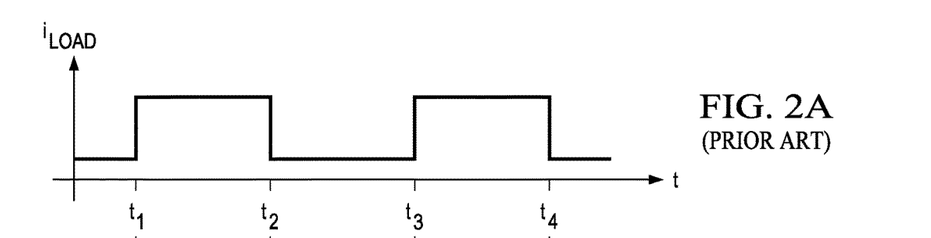
FIGS. 2A, 2B and 2C are timing diagrams illustrating current, voltage, and signal waveforms in the voltage regulator of FIG. 1.
Figure 2B:
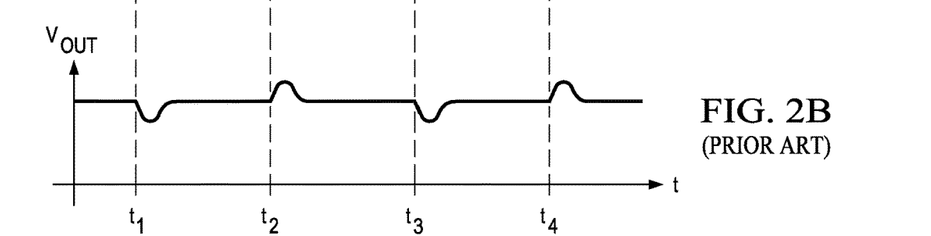
Figure 2C:
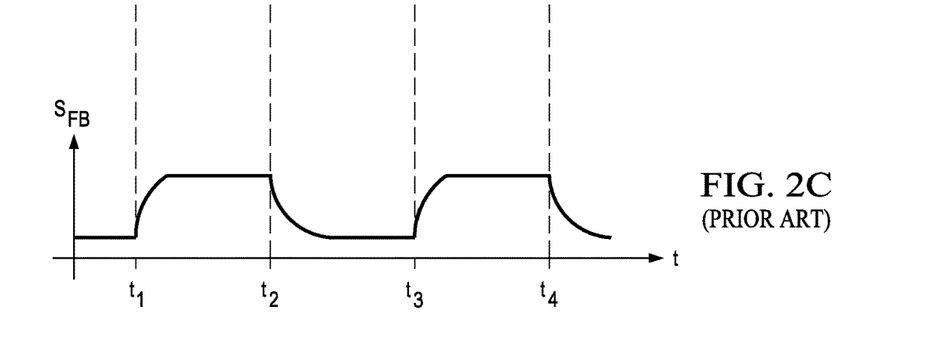

FIGS. 2A-2C illustrate various example waveforms associated with the example voltage regulator 100 of FIG. 1. In the example of FIG. 2A, the current $i_{LOAD}$ to the system 108 varies periodically, suddenly increasing at times $t_1$ and $t_3$, and suddenly decreasing at times $t_2$ and $t_4$.

In FIG. 2B, the voltage regulator 100 of FIG. 1 cannot respond instantaneously to the load current changes depicted in FIG. 2A. When the load current $i_{LOAD}$ increases ($t_1$, $t_3$), the current provided by the DC-DC converter 102 ($i_{OUT}$) is insufficient, and the output voltage $V_{OUT}$ starts to decrease as the output capacitor 106 starts to discharge. It takes a finite amount of time for the closed-loop voltage regulator system to respond and restore the output voltage $V_{OUT}$ back to the desired voltage, so negative voltage transients are generated on the output voltage $V_{OUT}$ at times $t_1$ and $t_3$. Likewise, when the load current $i_{LOAD}$ decreases ($t_2$, $t_4$), the DC-DC converter 102 provides more current ($i_{OUT}$) than the load 110 requires, and the output voltage $V_{OUT}$ starts to increase as the capacitor 106 starts to charge. Again, it takes a finite amount of time for the closed-loop voltage regulator system to respond, and positive voltage transients are generated on the output voltage $V_{OUT}$ at times $t_2$ and $t_4$. If the voltage transients on $V_{OUT}$ are sufficiently large, and if the frequency of the voltage transients is within the human auditory band, the output capacitor 106 may generate objectionable auditory noise.

In FIG. 1, the feedback signal $S_{FB}$ controls the current output of the DC-DC converter 102. In FIG. 2C, at times $t_1$ and $t_3$, the closed-loop voltage regulator response time causes the feedback signal $S_{FB}$ to slowly increase to a higher level to increase $i_{OUT}$ (the current output of the DC-DC converter 102), and at times $t_2$ and $t_4$, the voltage regulator closed-loop response time causes the feedback signal $S_{FB}$ to slowly decrease to a lower level to decrease $i_{OUT}$.

Figure 3:
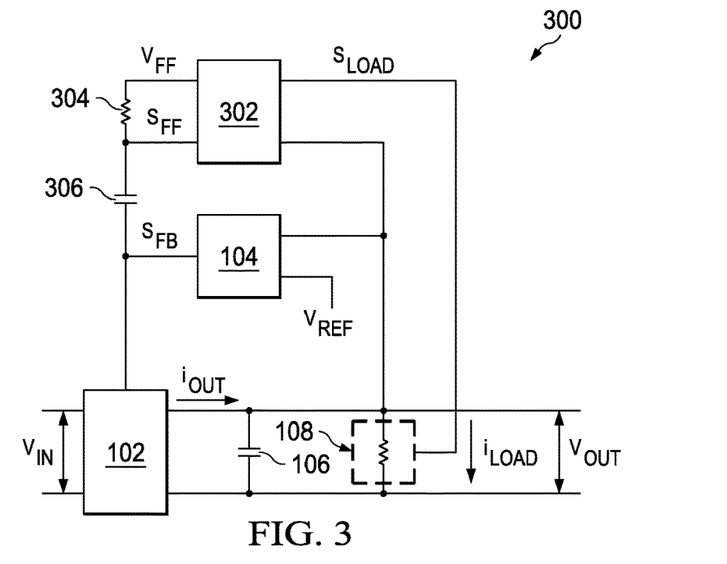
FIG. 3 is a schematic block diagram of an example embodiment of an improved voltage regulator.

FIG. 3 illustrates an example embodiment of an improved voltage regulator 300, which is the voltage regulator 100 of FIG. 1 with additional feedforward circuitry added. Signal $S_{LOAD}$ is a signal from the system 108 being powered by the voltage regulator 300, indicating the current required by the system 108. More specifically, signal $S_{LOAD}$ indicates that the system 108 will require a change in current, thereby allowing the voltage regulator 300 to anticipate a sudden change in load current. The feedforward circuit 302 uses the signal $S_{LOAD}$ to generate a feedforward signal $S_{FF}$ that is coupled to the feedback signal $S_{FB}$. The feedforward circuit 302 also receives the voltage regulator output voltage $V_{OUT}$. The feedforward circuit 302 uses $V_{OUT}$ and the signal $S_{LOAD}$ to generate a feedforward voltage output $V_{FF}$. The feedforward signal $S_{FF}$ has a variable amplitude, and the amplitude of the feedforward signal $S_{FF}$ is the amplitude of the feedforward voltage output $V_{FF}$. In FIG. 3, the modified feedback signal $S_{FB}$ is the sum of the output of the feedback circuitry 104 (as illustrated in FIG. 2C) and the feedforward signal $S_{FF}$. The signals $S_{LOAD}$, $S_{FF}$, the contribution of $S_{FF}$ to $S_{FB}$, and the resulting modified $S_{FB}$ are illustrated in FIGS. 4A-4D.

Typically, a voltage regulator cannot anticipate that load current is about to change. The signal $S_{LOAD}$ and the feedforward circuit 302 enable the voltage regulator 300 to anticipate a current change slightly before there is sufficient current change to be sensed in a feedback loop, and slightly before there is any transient on the output voltage $V_{OUT}$ to be sensed. The feedforward signal $S_{FF}$ modifies the feedback signal $S_{FB}$ so that instead of a relatively slow closed-loop response as in FIG. 2C, the modified feedback signal $S_{FB}$ responds instantly (but briefly) to signal $S_{LOAD}$. The feedforward Signal $S_{FF}$ adds a spike (a step in voltage followed by a decay) to the feedback signal $S_{FB}$ immediately after each step change in the signal $S_{LOAD}$. In the example of FIG. 3, the feedforward signal $S_{FF}$ is capacitively coupled to the feedback signal $S_{FB}$, but capacitive coupling is not required. The capacitive coupling is just one example of a way to provide a brief signal after each step in signal $S_{LOAD}$. When the signal $S_{LOAD}$ is periodic, the feedforward circuit 302 can adjust the amplitude of the feedforward signal $S_{FF}$ (the amplitude of the feedforward signal $S_{FF}$ is the amplitude of the feedforward voltage output $V_{FF}$) over time so that corresponding periodic voltage transients on the output voltage $V_{OUT}$ are essentially eliminated.

Figure 4A:
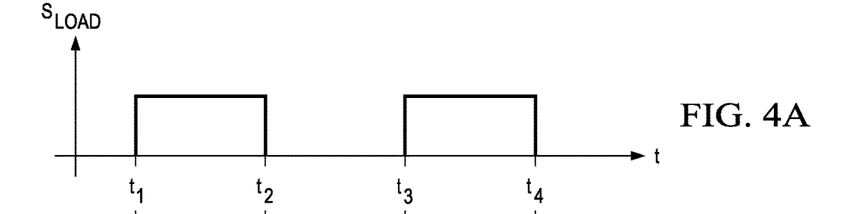
FIGS. 4A, 4B, 4C and 4D are timing diagrams illustrating signal and voltage waveforms in the voltage regulator of FIG. 3.

In FIG. 4A, the signal $S_{LOAD}$ is a signal from the system 108 being powered by the voltage regulator 300. The signal $S_{LOAD}$ is a signal corresponding to a changing system current, for example a signal in a controller that will change a state of the system 108. For example, $S_{LOAD}$ may be a display refresh signal or a signal for periodic pulse-width-modulated display back-lighting. In the example of FIG. 4A, when $S_{LOAD}$ is high, load current $i_{LOAD}$ is high, and when $S_{LOAD}$ is low, load current $i_{LOAD}$ is low.

Figure 4B:
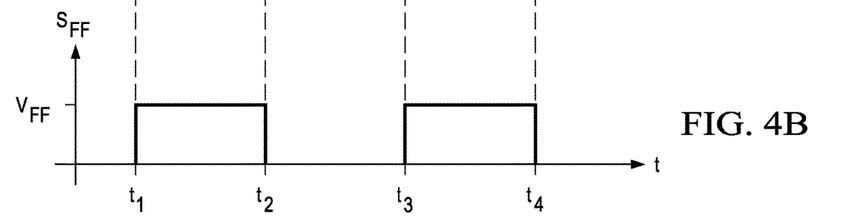

In FIG. 4B, the feedforward signal $S_{FF}$ is a signal with the same timing as the load signal $S_{LOAD}$ but with a variable amplitude (the amplitude of the feedforward signal $S_{FF}$ is the amplitude of the feedforward voltage output $V_{FF}$). For the example of FIG. 3, the modified feedback signal $S_{FB}$ is the sum of the output of the feedback circuitry 104 (as illustrated in FIG. 2C) and the capacitively coupled feedforward signal $S_{FF}$.

Figure 4C:
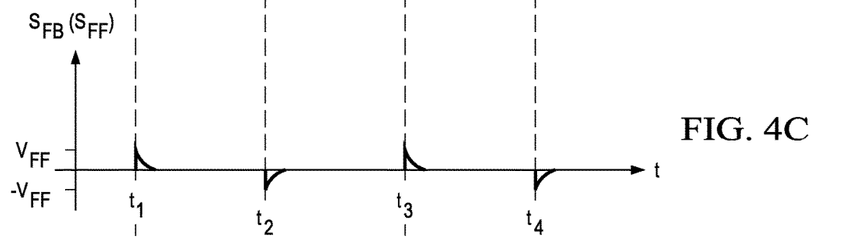

In FIG. 4C, signal $S_{FB}(S_{FF})$ is the contribution of the feedforward signal $S_{FF}$ to the modified feedback signal $S_{FB}$. $S_{FB}(S_{FF})$ adds a positive step to the feedback signal $S_{FB}$ at times $t_1$ and $t_3$, and each step decays as determined by a resistor 304 and capacitor 306. $S_{FB}(S_{FF})$ adds a negative step to the feedback signal $S_{FB}$ at times $t_2$ and $t_4$, and each step decays as determined by the resistor 304 and capacitor 306. Again, capacitive coupling is just one example of a way to implement a brief response to each step in $V_{LOAD}$. The variable amplitude of the steps is the amplitude of the feedforward voltage output $V_{FF}$ from the feedforward circuit 302.

Figure 4D:
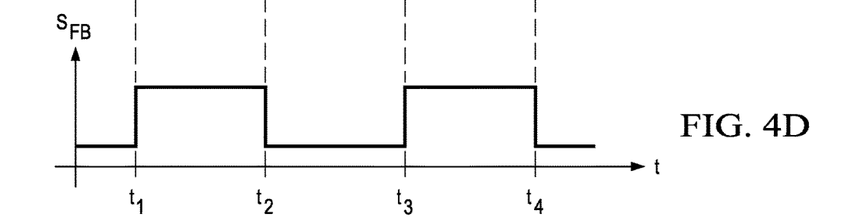

FIG. 4D illustrates the feedback signal $S_{FB}$ when the decaying steps from the feedforward signal $S_{FF}$ are added to the output of the feedback circuit 104 (as illustrated in FIG. 2C). The resulting feedback signal $S_{FB}$ has essentially instantaneous rise and fall times. The rapid rise and fall times of the feedback signal $S_{FB}$ cause the DC-DC converter 102 to respond immediately to load current changes at times $t_1$, $t_2$, $t_3$, and $t_4$, in contrast to the slower closed-loop response times illustrated in FIG. 2C. Effectively, the feedforward circuit 302 causes the DC-DC converter circuit 102 to respond to a load current change before there is any change on the output voltage $V_{OUT}$, and the periodic voltage transients on $V_{OUT}$ resulting from the periodic load current changes are essentially eliminated. As a result of eliminating the periodic voltage transients on $V_{OUT}$, audible noise from the output capacitor 106 is eliminated.

Figure 5:
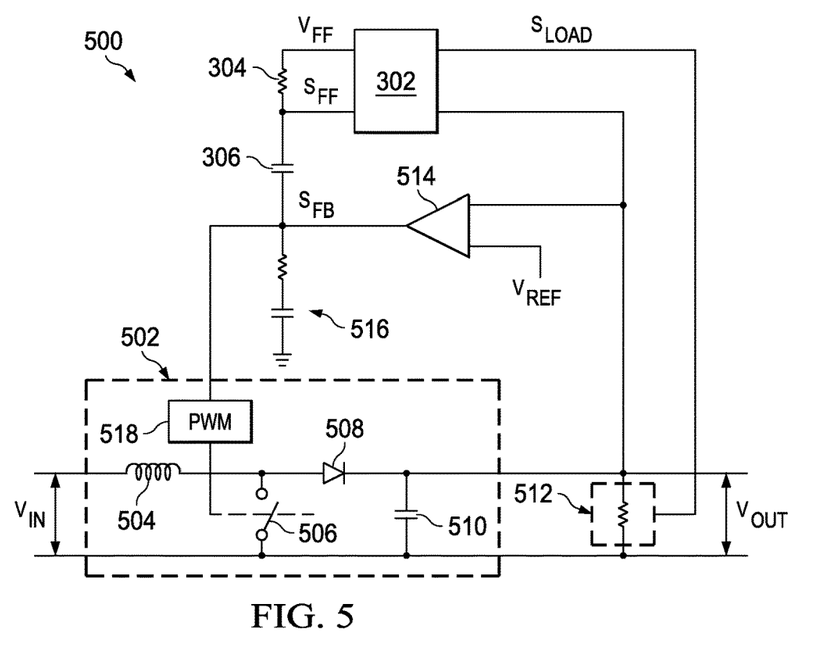
FIG. 5 is a schematic block diagram illustrating additional detail for an example embodiment of part of the voltage regulator of FIG. 3.

FIG. 5 illustrates additional detail for an example embodiment of the voltage regulator 300 of FIG. 3, using a switching DC-DC converter 502. In FIG. 5, the DC-DC converter 502 illustrates one possible example of the DC-DC converter 102 of FIG. 3. The DC-DC converter 502 is an example of a switching DC-DC boost converter (the output voltage $V_{OUT}$ is higher than the input voltage $V_{IN}$). The DC-DC converter 502 comprises an inductor 504, an electronic switch (transistor) 506, and a diode 508. An output capacitor 510 is an essential energy storage component of the DC-DC conversion process, and output capacitor 510 helps reduce output voltage transients. When the switch 506 is open, current flows from the input $V_{IN}$ and from stored energy in the inductor 504 into the load 512 and into the output capacitor 510. When the switch 506 is closed, energy is stored in the inductor 504, and current to the load 512 flows from stored energy in the output capacitor 510. The example voltage regulator 500 uses feedback from the output voltage $V_{OUT}$ to regulate the output voltage. An amplifier 514 compares the output voltage $V_{OUT}$ to a reference voltage $V_{REF}$. A compensation network 516 ensures stability for the closed-loop voltage regulation system. Note that many commercially available voltage regulators have an external connection (called VCOMP) for a compensation network. Therefore, the circuits of FIG. 3 or 5 may be implemented as an external circuit for commercially available integrated circuits, or the circuits of FIG. 3 or 5 may be integrated. A pulse-width-modulation (PWM) circuit 518 controls the duty cycle of the switch 506 to maintain a constant output voltage. When the duty cycle increases (that is, when the switch 506 is closed for a longer portion of each switching cycle), then more current is provided to the load 512 during each switching cycle. When the duty cycle decreases, then less current is provided to the load 512 during each switching cycle. If the current required by the load changes, it takes a finite amount of time for the output voltage $V_{OUT}$ to change, and for the amplifier 514 to sense the output voltage change, and for the PWM circuit 518 to change the duty cycle of the switch 506 to restore the output voltage $V_{OUT}$ to the target voltage.

There are many variations in switching DC-DC converter designs. The diode 506 may be replaced by another electronic switch. For step-down DC-DC converters, the input voltage $V_{IN}$ is higher than the output voltage $V_{OUT}$, and the switch(es) are between the input voltage and the inductor. The on-time or off-time of the switch(es) may be constant and the switching frequency may be varied. Both the duty cycle and the switching frequency of the switch(es) may be varied. There may be multiple feedback loops. The particular circuit of FIG. 5 is just one example of a voltage regulator using just one example of a switching DC-DC converter for purposes of illustration. The invention applies equally to voltage regulators using other types of DC-DC converters and the invention applies equally to linear voltage regulators.

Figure 6:
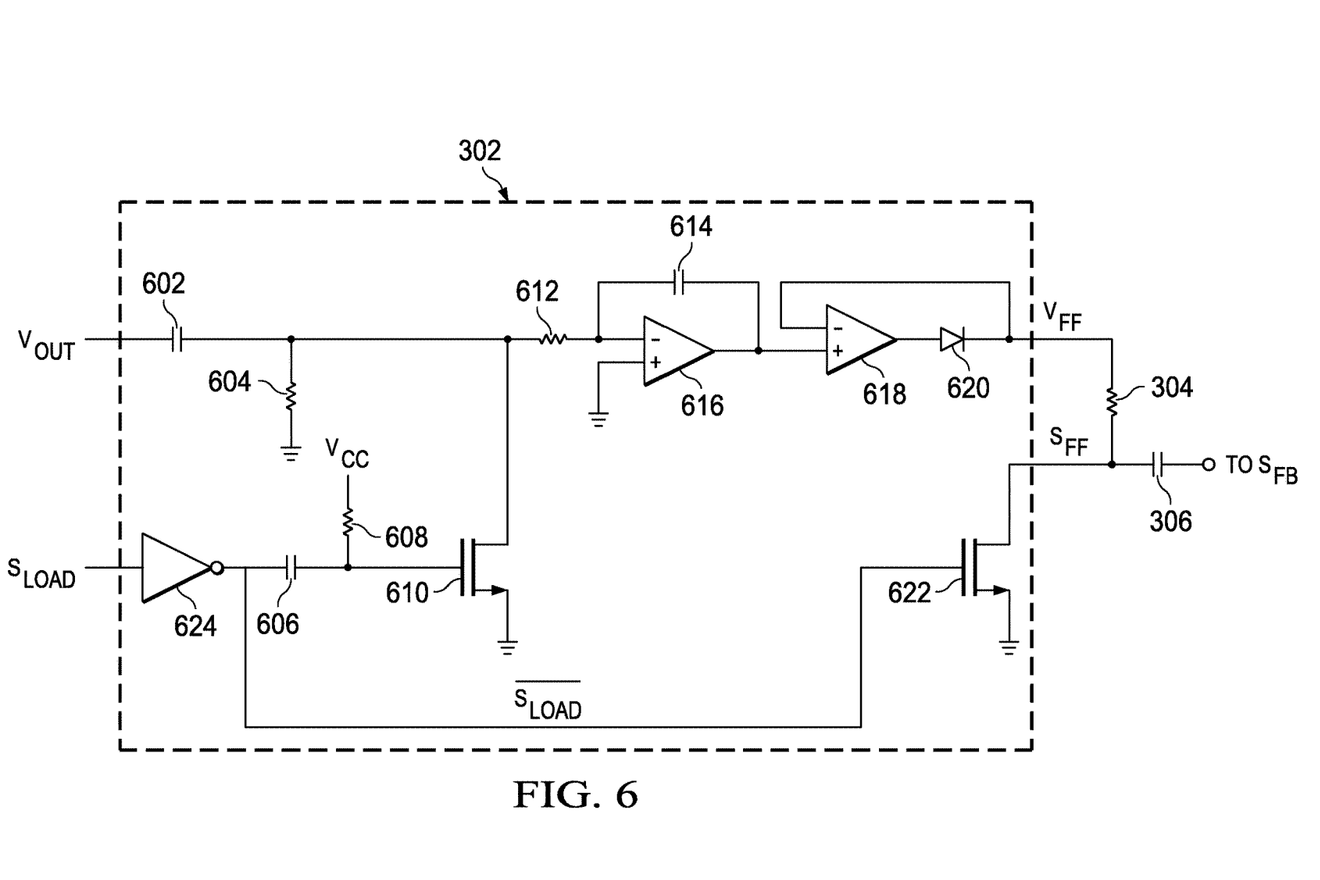
FIG. 6 is a schematic block diagram illustrating additional detail for an example embodiment of part of the voltage regulator of FIG. 3.

FIG. 6 illustrates additional detail of an example embodiment of the feedforward circuit 302 illustrated in FIG. 3. First, note that at the output, the feedforward signal $S_{FF}$, the feedforward voltage output $V_{FF}$, the resistor 304, and the capacitor 306 are as illustrated in FIG. 3. In FIG. 6, an inverter 624 inverts the load signal $S_{LOAD}$. A transistor switch 622, controlled by the signal inverted $S_{LOAD}$, generates a step in the feedforward signal $S_{FF}$ at each transition of the signal inverted $S_{LOAD}$, and each step in the feedforward signal $S_{FF}$ decays as determined by resistance 304 and capacitance 306. The magnitude of each step in the feedforward signal $S_{FF}$ is the magnitude of the feedforward voltage output $V_{FF}$, as controlled by an amplifier 616. At the input stage, a capacitor 602 and a resistor 604 form a high-pass filter. The output of the high-pass filter is gated by a transistor 610. Transistor 610 grounds the output of the high-pass filter except for a brief time after a high-to-low transition of signal inverted $S_{LOAD}$. That is, with a capacitor 606 and a resistor 608, a high-to-low transition of signal inverted $S_{LOAD}$ generates a spike (a step in voltage followed by a decay) that causes transistor 610 to momentarily turn off, which allows the output of the high-pass filter to pass to a resistor 612. The amplifier 616, a capacitor 614, and the resistor 612 form an integrator. In essence, the integrator integrates AC transitions of $V_{OUT}$ that occur just after each high-to-low transition of signal inverted $S_{LOAD}$ (FIG. 4A, $t_1$, $t_3$). The integrator adjusts the feedforward voltage output $V_{FF}$ to drive the AC transitions of $V_{OUT}$ (occurring just after each high-to-low transition of inverted $S_{LOAD}$) to zero. Note that the circuit as illustrated adjusts the feedforward voltage output $V_{FF}$ only in response to high-to-low transitions of the signal inverted $S_{LOAD}$, assuming that the voltage transients on $V_{OUT}$ (FIG. 2B) are symmetrical. If for some reason the rises and drops in signal inverted $S_{LOAD}$ are asymmetrical, then a second feedforward circuit as in the feedforward circuit 302 may be added for the low-to-high transitions. Amplifier 618 and diode 620 are optional depending on the types of amplifiers being used. In one specific embodiment, bipolar amplifiers are used, so amplifier 618 and diode 620 are needed to prevent negative values of $V_2$.

Note that the circuit 302 has both feedforward and feedback characteristics. Typically, a feedforward control circuit controls an output independently from changes in the output. The circuit 302 has a feedforward characteristic in that it controls the output $V_{OUT}$ in response to an external signal $S_{LOAD}$ that is independent of changes in the output $V_{OUT}$. The circuit 302 also includes a feedback characteristic in that changes in the output $V_{OUT}$ are used to adjust the amplitude of the feedforward signal $S_{FF}$.

Figure 7:
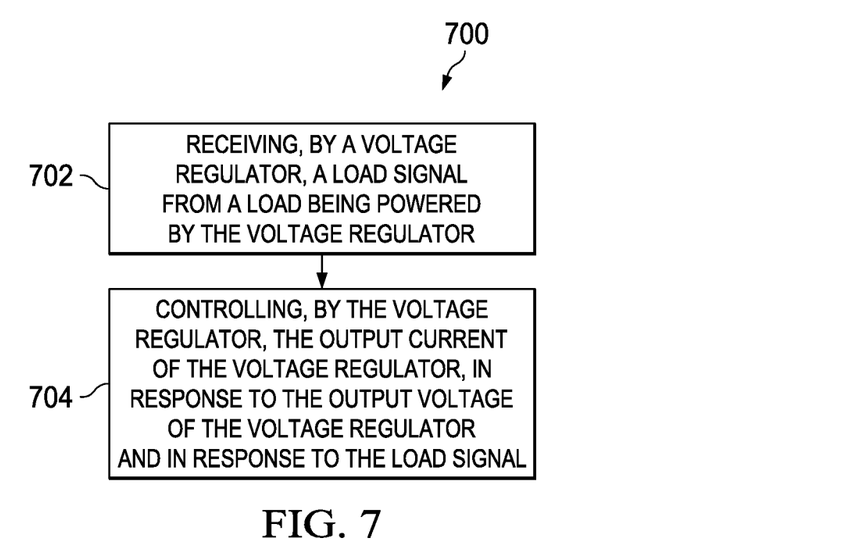
FIG. 7 is a flow chart of an example embodiment of a method for reducing periodic output voltage ripple in a voltage regulator.

FIG. 7 illustrates an example method 700. At step 702, a voltage regulator receives a load signal from a load being powered by the voltage regulator. At step 704, the voltage regulator controls the output current of the voltage regulator in response to the output voltage of the voltage regulator and in response to the load signal.

What is claimed is:

1. A circuit comprising:
 a first input configured to receive a first voltage indicative of an output voltage of a power converter;
 a second input configured to receive a second voltage indicative of a change in a load current of the power converter;
 a first circuit path that includes:
  a high-pass filter having a filter input coupled to the first input, and a filter output and
  an integrator having an integrator input coupled to the filter output, and an integrator output configured to deliver the first output signal synchronized by the second output signal;
  wherein the first circuit path is configured to generate a first output signal corresponding to a magnitude of a load transient based on the first voltage and the second voltage; and
 a second circuit path configured to generate a second output signal corresponding to a timing of the load transient based on the second voltage.

2. The circuit of claim 1, wherein the integrator includes:
 an amplifier having a negative input, a positive input, and an amplifier output coupled to the integrator output;
 a resistor coupled between the filter output and the negative input; and
 a capacitor coupled between the negative input and the amplifier output.

3. The circuit of claim 1, wherein the second circuit path includes:
 a discharge path configured to discharge the integrator input, and the discharge path configured to be deactivated for a period based on a time constant and in response to the second output signal.

4. The circuit of claim 3, wherein the discharge path includes:
 a transistor having a first current terminal coupled to the integrator input, a second current terminal coupled to a ground terminal, and a control terminal;
 a resistor coupled between the control terminal and a voltage supply terminal; and
 a capacitor coupled between the control terminal and the second input.

5. The circuit of claim 3, wherein the discharge path includes:
 a transistor having a first current terminal coupled to the integrator input, a second current terminal coupled to a ground terminal, and a control terminal;
 a resistor coupled between the control terminal and a voltage supply terminal;
 an inverter having an inverter input coupled to the second input, and an inverter output; and
 a capacitor coupled between the control terminal and the inverter output.

6. The circuit of claim 1, wherein the second circuit path includes:
 a discharge path configured to discharge the integrator output, and the discharge path configured to be deactivated when the second output signal is asserted.

7. The circuit of claim 6, wherein the discharge path includes:
 a transistor having a first current terminal coupled to the integrator input, a second current terminal coupled to a ground terminal, and a control terminal coupled to the second input;
 a resistor coupled between the first current terminal and the integrator output; and
 a capacitor coupled between the first current terminal and an output terminal.

8. The circuit of claim 6, wherein the discharge path includes:
 an inverter having an inverter input coupled to the second input, and an inverter output;
 a transistor having a first current terminal coupled to the integrator input, a second current terminal coupled to a ground terminal, and a control terminal coupled to the inverter output;
 a resistor coupled between the first current terminal and the integrator output; and
 a capacitor coupled between the first current terminal and an output terminal.

9. The circuit of claim 1, wherein the first circuit path includes: an amplifier having a positive input coupled to the integrator output, a negative input, and an amplifier output;

and a diode having an anode coupled to the amplifier output, and a cathode coupled to the negative input, the cathode configured to deliver the first output signal synchronized by the second output signal.

10. A power converter comprising:
a feedforward (FF) circuit including:
a first input configured to receive a first voltage indicative of an output voltage of a power converter;
a second input configured to receive a second voltage indicative of a change in a load current of the power converter;
a first circuit path configured to generate a first output signal corresponding to a magnitude of a load transient based on the first voltage and the second voltage;
a second circuit path configured to generate a second output signal corresponding to a timing of the load transient based on the second voltage; and
an FF output configured to deliver an FF signal including the first output signal synchronized by the second output signal;
a feedback (FB) circuit including an input configured to receive the first voltage, and an FB output; and
a summing node coupled to the FF output and the FB output.

11. The power converter of claim 10, wherein the first circuit path includes:
a high-pass filter having a filter input coupled to the first input, and a filter output;
an integrator having an integrator input coupled to the filter output, and an integrator output configured to deliver the first output signal synchronized by the second output signal.

12. The power converter of claim 11, wherein the integrator includes:
an amplifier having a negative input, a positive input, and an amplifier output coupled to the integrator output;
a resistor coupled between the filter output and the negative input; and
a capacitor coupled between the negative input and the amplifier output.

13. The power converter of claim 11, wherein the second circuit path includes:
a discharge path configured to discharge the integrator input, and the discharge path configured to be deactivated for a period based on a time constant and in response to the second output signal.

14. The power converter of claim 13, wherein the discharge path includes:
a transistor having a first current terminal coupled to the integrator input, a second current terminal coupled to a ground terminal, and a control terminal;
a resistor coupled between the control terminal and a voltage supply terminal; and
a capacitor coupled between the control terminal and the second input.

15. The power converter of claim 13, wherein the discharge path includes:
a transistor having a first current terminal coupled to the integrator input, a second current terminal coupled to a ground terminal, and a control terminal;
a resistor coupled between the control terminal and a voltage supply terminal;
an inverter having an inverter input coupled to the second input, and an inverter output; and
a capacitor coupled between the control terminal and the inverter output.

16. The power converter of claim 11, wherein the second circuit path includes:
a discharge path configured to discharge the integrator output, and the discharge path configured to be deactivated when the second output signal is asserted.

17. The power converter of claim 16, wherein the discharge path includes:
a transistor having a first current terminal coupled to the integrator input, a second current terminal coupled to a ground terminal, and a control terminal coupled to the second input;
a resistor coupled between the first current terminal and the integrator output; and
a capacitor coupled between the first current terminal and an output terminal.

18. The power converter of claim 16, wherein the discharge path includes:
an inverter having an inverter input coupled to the second input, and an inverter output;
a transistor having a first current terminal coupled to the integrator input, a second current terminal coupled to a ground terminal, and a control terminal coupled to the inverter output;
a resistor coupled between the first current terminal and the integrator output; and
a capacitor coupled between the first current terminal and an output terminal.

19. The power converter of claim 10, wherein the first circuit path includes:
a high-pass filter having a filter input coupled to the first input, and a filter output;
an integrator having an integrator input coupled to the filter output, and an integrator output;
an amplifier having a positive input coupled to the integrator output, a negative input, and an amplifier output; and
a diode having an anode coupled to the amplifier output, and a cathode coupled to the negative input, the cathode configured to deliver the first output signal synchronized by the second output signal.

* * * * *